G. HANLON.
OBSERVATION SHIP.
APPLICATION FILED SEPT. 17, 1915.
1,187,062.
Patented June 13, 1916.
2 SHEETS—SHEET 1.
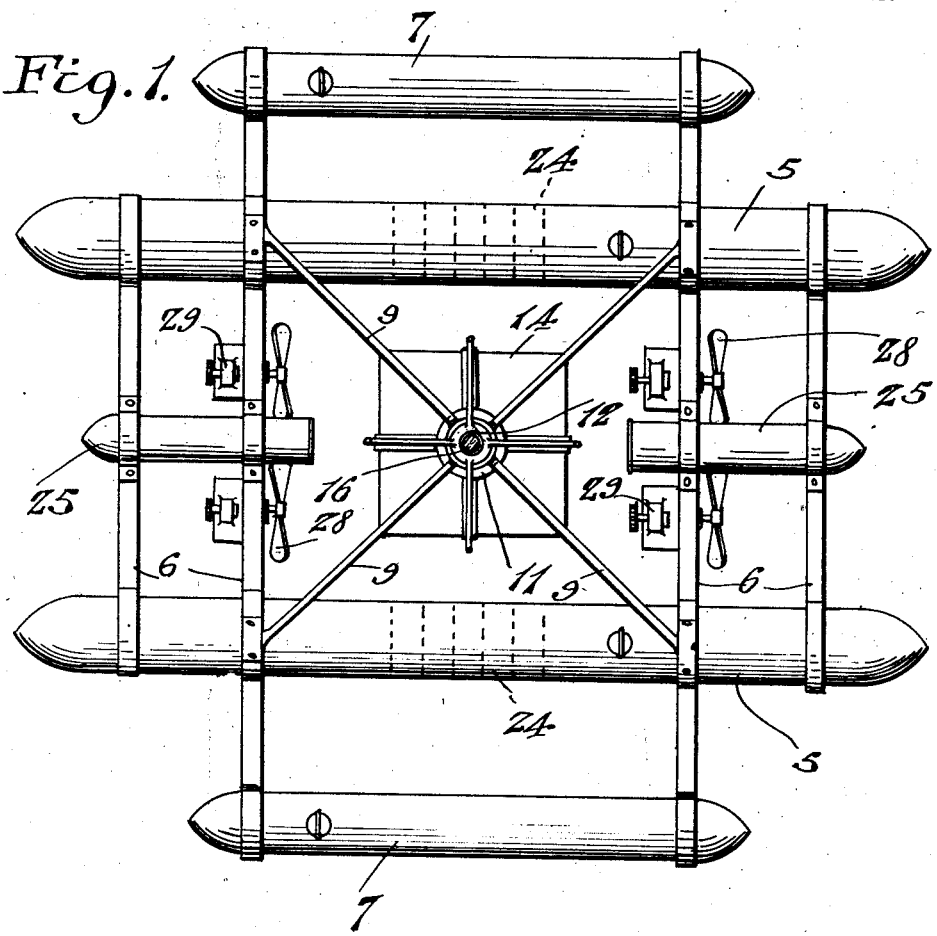
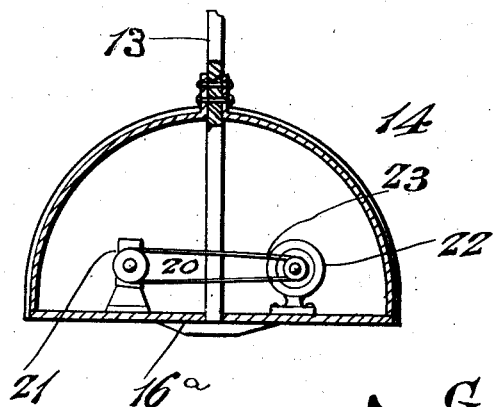

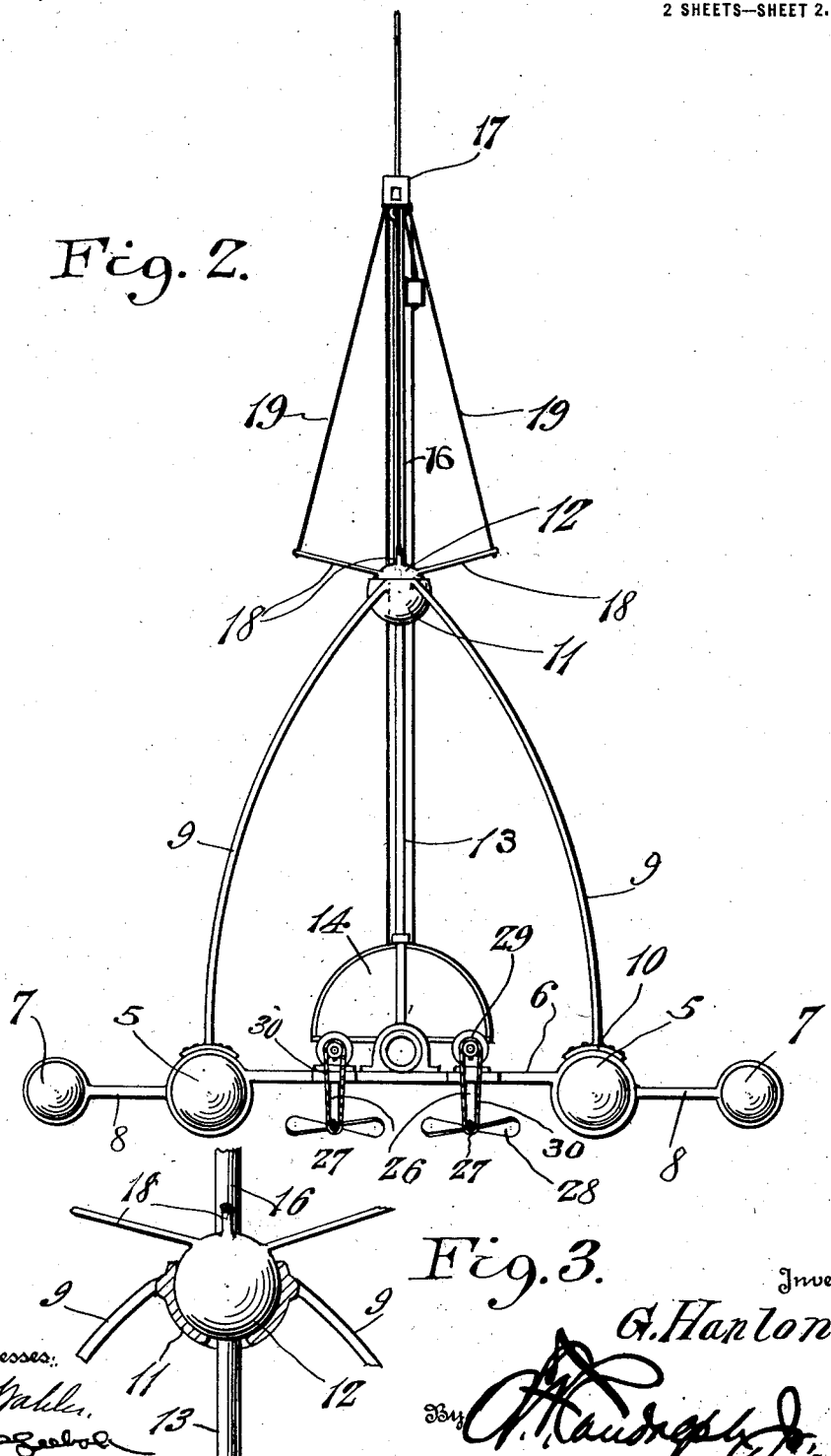

UNITED STATES PATENT OFFICE.

GEORGE HANLON, OF SHAWNEETOWN, ILLINOIS.

OBSERVATION-SHIP.

1,187,062.

Specification of Letters Patent. Patented June 13, 1916.

Application filed September 17, 1915. Serial No. 51,225.

*To all whom it may concern:*

Be it known that I, GEORGE HANLON, a citizen of the United States, residing at Shawneetown, in the county of Gallatin and State of Illinois, have invented certain new and useful Improvements in Observation-Ships; and I do hereby declare the following to be a full, clear, and exact description of the invention, such as will enable others skilled in the art to which it appertains to make and use the same.

This invention relates to ships, and more particularly to fast vessels of light draft especially designed for observation, patrol, guard, scout and messenger service in naval warfare.

The invention has for its primary object to provide an observation ship of light draft for use in deep or shallow water including essentially a plurality of floats, an observation cage, and a pendulum pivotally supported upon the floats whereby the observation cage and housing arranged below the cage are retained in horizontal position regardless of the rolling or pitching of the ship.

With this and other objects in view, the invention consists in the novel construction, arrangement and formation of parts as will be hereinafter specifically described, claimed and illustrated in the accompanying drawings, in which:

Figure 1 represents a top plan view of the observation ship partly in section, Fig. 2 represents a front elevation thereof, Fig. 3 represents a fragmental detail view, partly in section, illustrating the manner of pivotally supporting the pendulum, and Fig. 4 represents an enlarged detail sectional view through the platform supported at the lower end of the pendulum.

Referring to the drawings in detail, wherein similar reference numerals designate corresponding parts throughout the several views, the numerals 5 indicate a pair of spaced parallel torpedo shaped floats, which are rigidly connected by a plurality of connecting members 6. Relatively small floats 7 are arranged outwardly of the floats 5 and are connected therewith by horizontally disposed connecting members 8.

A pair of arch members 9 are provided at their lower ends 10 with feet secured to the floats 5 adjacent the forward and rear extremities thereof. The arch or supporting members 9 converge at a point centrally above the floats 5 and are connected by a semi-spherical socket 11 in which is pivotally supported a ball 12 carrying a depending pendulum 13. A receptacle, or housing, 14 is rigidly secured in any suitable manner to the lower extremity of the pendulum 13 and includes a floor 16ª designed to accommodate the crew of the ship.

A vertically disposed post 16 is formed integral with the ball 12 and is disposed in alinement with the pendulum 13 and supports a preferred type of observation cage 17 at its upper end and extending upwardly from the cage is a rod to be used to support the antennæ of a wireless telegraph station. The ball 12 is also formed with a plurality of radiating arms 18, which are connected with the cage 17 by a plurality of bracing cables 19.

The housing 14 and power plant 20, together with arms and ammunition for attack and defense mounted therein constitute a weight, which normally retains the pendulum 13 and post 16 in a vertical position regardless of the position of the floats 5 and 7. The power plant preferably comprises a gas engine 21 and a dynamo electric machine 22 connected with the engine 21 by a belt 23 or other suitable type of power transmitting device. The liquid fuel for the engine 21 may be stored in adequate quantities in the several floats 5 and 7 and the storage batteries with which the dynamo 22 is connected may also be supported in the floats. Torpedo launching tubes 25 are preferably supported upon the connecting members 6 between the floats 5, the torpedo tubes being provided as a means of attack or protection against attack by submarines or other marine war craft.

The connecting members 6 are provided with a plurality of depending bearing members 26 in which are rotatably supported shafts 27 carrying screw propellers 28. Electric motors 29 are supported upon the connecting members 6 above each of the propellers 28 and are connected therewith by chains or other suitable type of power transmitting devices.

What I claim is:

1. An observation ship including a plurality of floats, a plurality of supporting members arranged upon said floats, a pendulum pivotally supported in the upper extremities of said supporting members, a weight carried by the lower extremity of said pendulum, a post projecting upwardly from said pendulum, a plurality of arms carried by said pendulum, an observation cage supported upon the upper extremity of said post, and a plurality of bracing cables connecting said arms with said observation cage.

2. An observation ship including a plurality of floats, horizontally disposed connecting members connecting said floats, a pendulum pivotally supported above said floats, a weight carried by the lower extremity of said pendulum, a post projecting upwardly from said pendulum, an observation cage supported upon the upper extremity of said post, and bracing means connecting said observation cage with said pendulum.

In testimony whereof I affix my signature in presence of two witnesses.

GEORGE HANLON.

Witnesses:
WILLIAM M. KELLIGATT,
EARL GALLOWAY.